(12) United States Patent
Davis et al.

(10) Patent No.: US 9,598,861 B2
(45) Date of Patent: Mar. 21, 2017

(54) FIRE-RESISTANT ULTRA-LIGHTWEIGHT PANEL WITH THREE-DIMENSIONAL SURFACE DESIGN

(75) Inventors: George Kalogridis Davis, Dallas, TX (US); Li-Ching Liu Tsai, Dallas, TX (US)

(73) Assignee: George Kalogridis Davis, Dallas, TX (US)

( * ) Notice: Subject to any disclaimer, the term of this patent is extended or adjusted under 35 U.S.C. 154(b) by 458 days.

(21) Appl. No.: 11/060,880

(22) Filed: Feb. 18, 2005

(65) Prior Publication Data
US 2006/0189236 A1     Aug. 24, 2006

(51) Int. Cl.
*B32B 5/26*     (2006.01)
*E04B 1/94*     (2006.01)
(Continued)

(52) U.S. Cl.
CPC .............. *E04B 1/941* (2013.01); *B32B 27/04* (2013.01); *B32B 27/08* (2013.01); *B32B 38/06* (2013.01);
(Continued)

(58) Field of Classification Search
CPC . B32B 9/046; B32B 27/34; B32B 2307/3065; B32B 5/26; B32B 27/12
(Continued)

(56) References Cited

U.S. PATENT DOCUMENTS

| 3,668,041 A | 6/1972 | Lonning |
| 3,890,892 A | 6/1975 | Loose et al. |

(Continued)

FOREIGN PATENT DOCUMENTS

| DE | 2655090 | 8/1979 |
| DE | 3424818 | 1/1985 |

(Continued)

*Primary Examiner* — Andrew Piziali
(74) *Attorney, Agent, or Firm* — George R. McGuire; Bond, Schoeneck & King, PLLC

(57) ABSTRACT

The invention relates to an ultra-lightweight heat and flame resistant (or retardant) composite panel having a three-dimensional artistic design on the surface, and a method for making the lightweight heat and flame resistant composite panel. One aspect of the invention is a system and method for creating a composite panel from high performance heat and flame resistant materials, such as aramid polyamide polymers (for example, NOMEX® from DuPont) or any other fire-retardant or fire-retardant treated material, which can be bonded to another layer of fire-retardant material such as paper, fabric, honeycomb or foam. The fire-retardant materials can be bonded by a welding machine such as an ultrasonic machine, or attached by a thermoplastic, thermoset, thermobond or other fire resistant adhesive. The thickness of the finished composite may be around ¹⁄₁₆~¼ inch. The composite can then be decorated, and carved (or embossed) with or without inserting a fire-retardant material between the layers prior to carving to give a three-dimensional decorative surface. The steps of decorating and carving may be performed in either sequence—coloring followed by carving, or carving followed by coloring. Alternatively, one or more layers may be printed prior to forming the composite. A clear finish with fire retardant agent is then placed on the surface of the composite.

24 Claims, 7 Drawing Sheets

(51) Int. Cl.

| | | |
|---|---|---|
| *B32B 27/04* | (2006.01) | |
| *B32B 27/08* | (2006.01) | |
| *B32B 38/06* | (2006.01) | |
| *B44C 3/00* | (2006.01) | |
| *B44C 3/02* | (2006.01) | |
| B32B 37/12 | (2006.01) | |
| B32B 37/14 | (2006.01) | |
| B32B 37/18 | (2006.01) | |
| B32B 38/14 | (2006.01) | |
| B60R 13/08 | (2006.01) | |

(52) U.S. Cl.
 CPC .............. *B44C 3/00* (2013.01); *B44C 3/02* (2013.01); *B32B 37/12* (2013.01); *B32B 37/146* (2013.01); *B32B 37/185* (2013.01); *B32B 38/14* (2013.01); *B32B 2307/3065* (2013.01); *B32B 2310/028* (2013.01); *B32B 2605/003* (2013.01); *B32B 2607/00* (2013.01); *B60R 13/08* (2013.01); *Y10T 442/2041* (2015.04); *Y10T 442/2049* (2015.04); *Y10T 442/2098* (2015.04); *Y10T 442/2631* (2015.04)

(58) Field of Classification Search
 USPC .............. 442/64, 65, 71, 136; 428/116, 117
 See application file for complete search history.

(56) References Cited

U.S. PATENT DOCUMENTS

| | | | |
|---|---|---|---|
| 3,998,789 A | 12/1976 | Yoshioka | |
| 4,110,277 A | 8/1978 | Economy et al. | |
| 4,557,961 A | 12/1985 | Gorges | |
| 4,693,926 A | 9/1987 | Kowalski et al. | |
| 4,726,987 A | 2/1988 | Trask et al. | |
| 4,752,300 A | 6/1988 | Johnson | |
| 4,780,359 A | 10/1988 | Trask et al. | |
| 4,888,091 A | 12/1989 | Nollen et al. | |
| 5,037,498 A * | 8/1991 | Umeda | 156/307.3 |
| 5,527,598 A | 6/1996 | Campbell et al. | |
| 5,593,780 A * | 1/1997 | Yap | 428/392 |
| 5,612,130 A | 3/1997 | Smirnov et al. | |
| 5,639,800 A | 6/1997 | von Bonin et al. | |
| 6,333,280 B1 | 12/2001 | Hashimoto et al. | |
| 6,432,236 B1 | 8/2002 | Leemon et al. | |
| 6,596,658 B1 | 7/2003 | Putnam et al. | |
| 6,790,795 B2 | 9/2004 | Erb, Jr. et al. | |
| 2002/0045091 A1 | 4/2002 | Kamei et al. | |
| 2003/0022577 A1 | 1/2003 | Kim et al. | |
| 2003/0124397 A1 | 7/2003 | Kim et al. | |
| 2004/0176004 A1 | 9/2004 | Fyfe | |

FOREIGN PATENT DOCUMENTS

| | | |
|---|---|---|
| DE | 8428375 | 1/1985 |
| DE | 68920802 T2 | 5/1995 |
| DE | 19512470 A1 | 10/1996 |
| EP | 0358031 B1 | 1/1995 |
| EP | 1164006 A | 12/2001 |
| GB | 2266858 A | 11/1993 |

\* cited by examiner

FIRE-RESISTANT ULTRA-LIGHTWEIGHT PANEL WITH THREE-DIMENSIONAL SURFACE DESIGN

BACKGROUND OF THE INVENTION

The invention relates to an ultra-lightweight heat and flame resistant (or retardant) composite panel having a three-dimensional artistic design on the surface, and a method for making the lightweight heat and flame resistant composite panel. One aspect of the invention is a system and method for creating a composite panel from high performance heat and flame resistant materials, such as aramid polyamide polymers (for example, NOMEX® from DuPont) or any other fire-retardant or fire-retardant treated material, which can be bonded to another layer of fire-retardant material such as paper, fabric, honeycomb or foam. The fire-retardant materials can be bonded by a welding machine such as an ultrasonic machine, or attached by a thermoplastic, thermoset, thermobond or other fire resistant adhesive. The thickness of the finished composite may be around 1/16~1/4 inch. The composite can then be decorated, and carved (or embossed) with or without inserting a fire-retardant material between the layers prior to carving to give a three-dimensional decorative surface. The steps of decorating and carving may be performed in either sequence—coloring followed by carving, or carving followed by coloring. Alternatively, one or more layers may be printed prior to forming the composite. A clear finish with fire retardant agent is then placed on the surface of the composite.

1. Field of the Invention

There are many applications today for fire-resistant barriers for safety purposes. For example, many forms of transportation have Federally mandated requirements for fire-resistant barriers and panels in the vehicles. Such uses include aircraft and trains. Federal standards are published that mandate the levels of performance required for certain applications. For example, 14 C.F.R. §25 sets forth Airworthiness Standards for Transport Category Airplanes. Sections 25.851 through 25.869 address fire protection. Section 25.853 states that materials used in compartments occupied by crew or passengers must meet certain test criteria set forth in Parts I and II of Appendix F to the regulation and §25.853(d) requires that certain interior components of airplanes with passenger capacities of 20 or more must also meet additional requirements set forth in Parts IV and V of Appendix F. Such components include interior ceiling and wall panels; partitions; galley structure; and large cabinets and cabin stowage compartments.

Part IV of Appendix F is titled "Test Method to Determine the Heat Release Rate From Cabin Materials Exposed to Radiant Heat" and sets out a method of testing a specimen and an Ohio State University ("OSU 65/65") rate of heat release apparatus (which is a modified version of the rate of heat release apparatus standardized by ASTM E-906) for testing. Using this test method, the total average positive heat release over the first two minutes of exposure for the samples must not exceed 65 kW-min/m$^2$, and the average peak heat release rate for the samples must not exceed 65 kW/m$^2$.

Part V of Appendix F is titled "Test Method to Determine the Smoke Emission Characteristics of Cabin Materials" and specifies that specimens must be constructed, conditioned and tested in the flaming mode in accordance with ASTM Standard Test Method F814-83. Using this test method, the average specific optical smoke density after four (4) minutes cannot exceed 200.

A number of fire-resistant materials have been developed over the years to meet these needs and Federal standards for use in aircraft and other applications. For example, coatings for materials have been developed as well as fire-resistant fabrics and papers. One such fire resistant material is NOMEX®, an aramid polyamide polymer made by DuPont, that is widely used in aircraft today for bulkhead tapestries. NOMEX® is available in different forms including fabrics and papers. Commonly, NOMEX® fibers are woven into decorative fabrics and used in bulkhead tapestries. While NOMEX® woven fabrics are suitable for use and meet current heat release rate and smoke density specifications, the resulting panel is expensive and heavy.

2. Description of Related Art

Fire-resistant coatings have been previously disclosed. For example, U.S. Published Patent Application No. US2004/0176004 to Fyfe titled "Method Of Applying Fire Protection Coating To FRP-Reinforced Structure," the disclosure of which is hereby incorporated by reference, discloses a method of applying fire protection coating to structures. An insulation layer of gypsum is applied to a structural member, then a diffusion barrier such as epoxy intumescent coating is applied over the gypsum mixture. The intumescent coating foams and chars when exposed to high temperature, and the charred surface resists combustion.

Fire-resistant lightweight panels and fabrics are also previously disclosed. For example, U.S. Published Patent Application No. US2003/0022577 to Kim et. al. titled "Fire-Resistant Panel Comprising Loess And Fire-Resistant Decorative Panel Using the Same," the disclosure of which is hereby incorporated by reference, discloses a fire resistant panel comprising a substrate material of a woven or non-woven fabric of inorganic fiber, or a paper; and a resin compound impregnated or coated onto the substrate material containing a thermosetting resin selected from a phenol resin, a modified phenol resin, a modified phenol-urea resin, a melamine resin, a modified melamine resin, a modified melamine-urea resin, a urea resin or a modified urea resin, a fire retardant and loess. The substrate is disclosed as glass fiber, alumina fiber or kraft paper. The fire retardant may contain phosphor and nitrogen and a solid phase such as dicyandiamide. The dicyandiamide reacts with materials in the resin compound to change them into nonflammable substances, resulting in fire-resistant effects such that the decorative panel will not burn. Loess, an inorganic filler that does not transfer heat, also absorbs heat to provide a fire-resistant effect. The loess also can exhibit different colors. A fire-resistant decorative panel is also disclosed made by superposing and molding under high temperature and pressure on a surface and/or a rear face of a laminated sheet substrate having a plurality of these fire-resistant panels. The panels are decorated by painting the surface of the decorative layer, or impregnating the surface of the decorative layer with a thermosetting resin.

U.S. Published Patent Application No. US2003/0124397 to Kim et. al. titled "Fire-Resistant Composite Panel And Fire-Resistant Decorative Panel Using The Same," the disclosure of which is hereby incorporated by reference, discloses a fire resistant panel comprising a substrate material of a woven or nonwoven fabric of inorganic fiber, or a paper; and a resin compound impregnated or coated onto the substrate material containing a thermosetting resin selected from a phenol resin, a modified phenol resin, a modified phenol-urea resin, a melamine resin, a modified melamine resin, a modified melamine-urea resin, a urea resin or a modified urea resin, a fire retardant and loess and additionally a rear layer of an aluminum sheet or a galvanized steel plate.

U.S. Pat. No. 6,790,795 to Erb, Jr. et. al. titled "Fire Blocking Fabric," the disclosure of which is hereby incorporated by reference, discloses a fire blocking material comprising a nonwoven fabric including para-aramid fibers and pre-oxidized polyacrylonitrile and optionally a garnett of recycled polybenzimidazole, para-aramid or meta-aramid or combinations.

U.S. Pat. No. 6,596,658 to Putnam et. al. titled "Laminated Fabric With Fire-Retardant Properties," the disclosure of which is hereby incorporated by reference, discloses a laminated fabric consisting of a relatively lightweight layer formed of dimensionally stable, heat-resistant fibers, such as NOMEX®, and a relatively heavyweight layer formed of one or more plies. The NOMEX® fiber layer can be prepared by known methods of carding and airlaying. The NOMEX® fiber layer is laminated to a support layer, made of a staple fiber web, by high pressure water streams. A three dimensional image is formed by guiding the laminate over an image transfer device while directing high pressure water against the outward surface of the laminate. The laminate may also be jet dyed.

U.S. Pat. No. 6,333,280 to Hashimoto et. al. titled "Flame-Retardant Or Incombustible Decorative Laminate Sheet," the disclosure of which is hereby incorporated by reference, discloses a flame-retardant or non-flammable decorative sheet which is a one piece laminate comprising a sheet material for a core layer obtained by impregnating a base sheet material made of an inorganic fiber, with a composition of a phenolic resin and/or a melamine resin and aluminum hydroxide and/or magnesium hydroxide, and a decorative sheet material placed on at least one side of the sheet material for the core layer. A reinforcing layer can also be interposed between multiple core layers. The decorative layer may be selected from various colors or patterns.

U.S. Pat. No. 5,612,130 to Smirnov et. al. titled "Fire-Resistant Multipurpose Protective Coating," the disclosure of which is hereby incorporated by reference, discloses a fire-resistant multipurpose protective coating comprising a two-layer coating in which the first layer is a heat-resistant oxidized graphite layer and the second layer is a hydrophobic highly-dispersed-hydrophobic powder layer containing a silicone liquid.

U.S. Pat. No. 4,780,359 to Trask et. al. titled "Fire Retardant Structural Textile Panel," the disclosure of which is hereby incorporated by reference, discloses a nonwoven textile panel for use as a fire retardant and sound deadening barrier in aircraft interiors comprising five layers of nonwoven textile fibers of polyphenylene sulfide fibers and NOMEX® fibers that have been carded, cross-lapped, needle punched and thermally bonded by heating the panel to the temperature softening point of the polyphenylene sulfide fibers, which has an exterior comprising a skin of polyvinyl chloride. The fibers are thermoformed and retain a permanent shape due to the thermoplastic properties of the polyphenylene sulfide fibers.

U.S. Pat. No. 4,752,300 to Johnson titled "Dyeing And Fire Retardant Treatment For Nomex," the disclosure of which is hereby incorporated by reference, discloses the concurrent dyeing and fire-retardant treatment of NOMEX®. A fire-retardant material or system along with a disperse dye or acid dye is applied to NOMEX® fiber in the form of staple, tow, or yarn; woven, non-woven, circular knitted, or tricot knitted fabrics; crimped, texturized, flocked or tufted textiles. The fire-retardant materials are thermally stable cyclic phosphonate esters, such as Antiblaze® 19. The fibers are heated in the presence of both the dyestuff plus fire retardant liquid in the range of 300-600° F. though the temperature may be higher.

U.S. Pat. No. 4,726,987 to Trask et. al. titled "Fire Retardant Structural Textile Panel," the disclosure of which is hereby incorporated by reference, discloses a nonwoven textile panel for use as a fire retardant and sound deadening barrier in aircraft interiors comprising five layers of nonwoven textile fibers of polyphenylene sulfide fibers and NOMEX® fibers that have been carded, cross-lapped, needle punched and thermally bonded by heating the panel to the temperature softening point of the polyphenylene sulfide fibers, which has an exterior comprising a skin of polyvinyl chloride. The fibers are thermoformed and retain a permanent shape due to the thermoplastic properties of the polyphenylene sulfide fibers. An alternative embodiment uses a layer of polyester polyurethane foam underneath the vinyl to shield it from the heat radiating properties of the polyphenylene sulfide and prevent puckering of the vinyl material during processing.

U.S. Pat. No. 4,693,926 to Kowalski et. al. titled "Flexible, Fire-Resistant, Decorative Laminates And Methods Of Manufacture Thereof," the disclosure of which is hereby incorporated by reference, discloses composite, lightweight, flexible, fire-resistant, decorative laminates suitable for use on bulkhead tapestries in aircraft. The laminates comprise a laminar fire-resistant layer including an aluminum foil sheet bonded to a first inert polyvinyl fluoride sheet; an underlying flexible paper-like base lamination; means for adhesively bonding the first sheet to the lamination; a resinous embossing film overlying to the aluminum foil sheet; and an outer transparent sheet of clear PVC. The lamination may be decorated by silk screening, a photograph or print, and is protected by an outer polyvinyl fluoride sheet.

U.S. Pat. No. 4,557,961 to Gorges titled "Lightweight, Fire-Retardant Structural Panel," the disclosure of which is hereby incorporated by reference, discloses a composite, lightweight, fire-retardant laminar structural panel comprising a sheet-like central honeycomb core formed of aluminum, paper treated to improve its fire-resistant characteristics; upper and lower perforate face sheets formed of lightweight fibrous materials impregnated with a phenolic resin; a pair of upper and lower phenolic adhesive films interposed between the honeycomb core and the imperforate face sheets; a fire-retardant coating comprising a copolymer of vinylidene fluoride and hexafluoropropene applied to an exposed surface of the lower face sheet.

SUMMARY OF THE INVENTION

The invention is an ultra-lightweight heat and flame resistant composite panel having a three-dimensional artistic design on the surface, and also a method for making the lightweight heat and flame resistant composite panel. One aspect of the invention is a system and method for creating a composite panel from layers of high performance heat and flame resistant materials, such as aramid polyamide polymers (for example, NOMEX®), which can be bonded to additional fire-retardant layers such as paper, fabric, honeycomb or foam. The term "fire-retardant materials" is used in this specification to refer to materials that comprise fire-retardant materials, or materials that are treated such that the treated materials are fire-retardant, whether or not the original material before treatment was fire-retardant. The fire-retardant materials can be bonded to each other by a welding machine such as an ultrasonic machine, or attached by a fire resistant adhesive. Optionally a fire-retardant material, such as Nomex® yarn or any other fire-retardant or fire-retardant treated material, can be inserted between layers of fire-retardant materials comprising the composite to achieve a significant three-dimensional affect. The thickness of the finished composite may be around 1/16~1/4 inch, depending on type and number of layers forming the composite. The composite can then be carved (or embossed) using ultrasonic radiation to give a three-dimensional decorative surface. The composite can be decorated by printing a surface of one of the fire-retardant materials prior to forming the composite. Alternatively, an outer surface of the composite can be colored after preparation of the composite. In this embodiment, the composite may be colored prior to, or after, carving. A clear finish with fire retardant agent is then placed on the colored surface of the composite.

It is therefore an object of the invention to provide an ultra-lightweight panel suitable for use in aircraft for bulkhead tapestries and wall panels that provides the same or better protection against heat release rate and smoke emission as currently used bulkhead tapestries and wall panels made of fabric from NOMEX® fiber.

It is also an object of the invention to provide an ultra-lightweight panel comprising two or more layers of adhesively bonded fire-retardant materials suitable for use in aircraft for bulkhead tapestries and wall panels that provides the same or better protection against heat release rate and smoke emission as currently used bulkhead tapestries and wall panels made of fabric from NOMEX® fiber.

It is also an object of the invention to provide an ultra-lightweight panel comprising two or more layers of adhesively bonded fire-retardant materials which have been colored and carved (or embossed) on the surface of the formed composite to provide a decorative appearance suitable for use in aircraft for bulkhead tapestries and wall panels that provides the same or better protection against heat release rate and smoke emission as currently used bulkhead tapestries and wall panels made of fabric from NOMEX® yarns.

It is also an object of the invention to provide an ultra-lightweight panel suitable for use as bulkhead tapestries and wall panels that meets or exceeds Federally mandated guidelines for heat release rate and smoke emission as measured by the tests set forth in Appendix F, Parts IV and V of 14 C.F.R. §25.

It is also an object of the invention to provide an ultra-lightweight panel suitable for use in any application where protection against heat release and smoke density is desired.

It is also an object of the invention to provide an ultra-lightweight panel suitable for use in any application where protection against heat release and smoke emissions is desired that weighs about 1.0 to about 2.5 oz/ft$^2$.

It is further an object of the invention to provide a method for preparing an ultra-lightweight panel by adhesively bonding two or more layers of fire-retardant materials suitable for use in aircraft for bulkhead tapestries and wall panels that provides the same or better protection against heat release rate and smoke emission as currently used bulkhead tapestries and wall panels made of fabric from NOMEX® fiber.

It is also an object of the invention to provide a method for preparing an ultra-lightweight panel suitable for use in aircraft for bulkhead tapestries and wall panels by adhesively bonding two or more layers of fire-retardant materials, where the fire-retardant materials comprise paper, fabric, foam, honeycomb or paper-backed adhesive, that provides the same or better protection against heat release rate and smoke emission as currently used bulkhead tapestries and wall panels made of fabric from NOMEX® fiber.

It is further an object of the invention to provide a method for preparing an ultra-lightweight panel suitable by adhesively bonding two or more layers of fire-retardant materials, and then carving (or embossing) the surface of the formed composite to provide a decorative appearance for use in aircraft for bulkhead tapestries and wall panels, that provides the same or better protection against heat release rate and smoke emission as currently used bulkhead tapestries and wall panels made of fabric from NOMEX® fiber.

It is further an object of the invention to provide a method for carving the surface of an ultra-lightweight panel prepared by adhesively bonding two or more layers of fire-retardant materials, where the surface of the composite is carved by directing ultrasonic radiation in the range of about 15 kHz to about 220 kHz at the surface when it is in a moistened state.

It is yet further an object of the invention to provide an apparatus suitable for carving the surface of an ultra-lightweight panel prepared by adhesively bonding two or more layers of fire-retardant materials, where the surface of the composite is carved (or embossed) by directing ultrasonic radiation in the range of about 15 kHz to about 220 kHz at the surface when it is in a moistened state using a specially designed horn tips for directing the ultrasonic radiation at the moistened composite surface.

BRIEF DESCRIPTION OF THE DRAWINGS

These and other features of the invention will be described more fully in conjunction with the following figures and the discussion that follows.

DETAILED DESCRIPTION OF PREFERRED EMBODIMENTS

Figure 1:
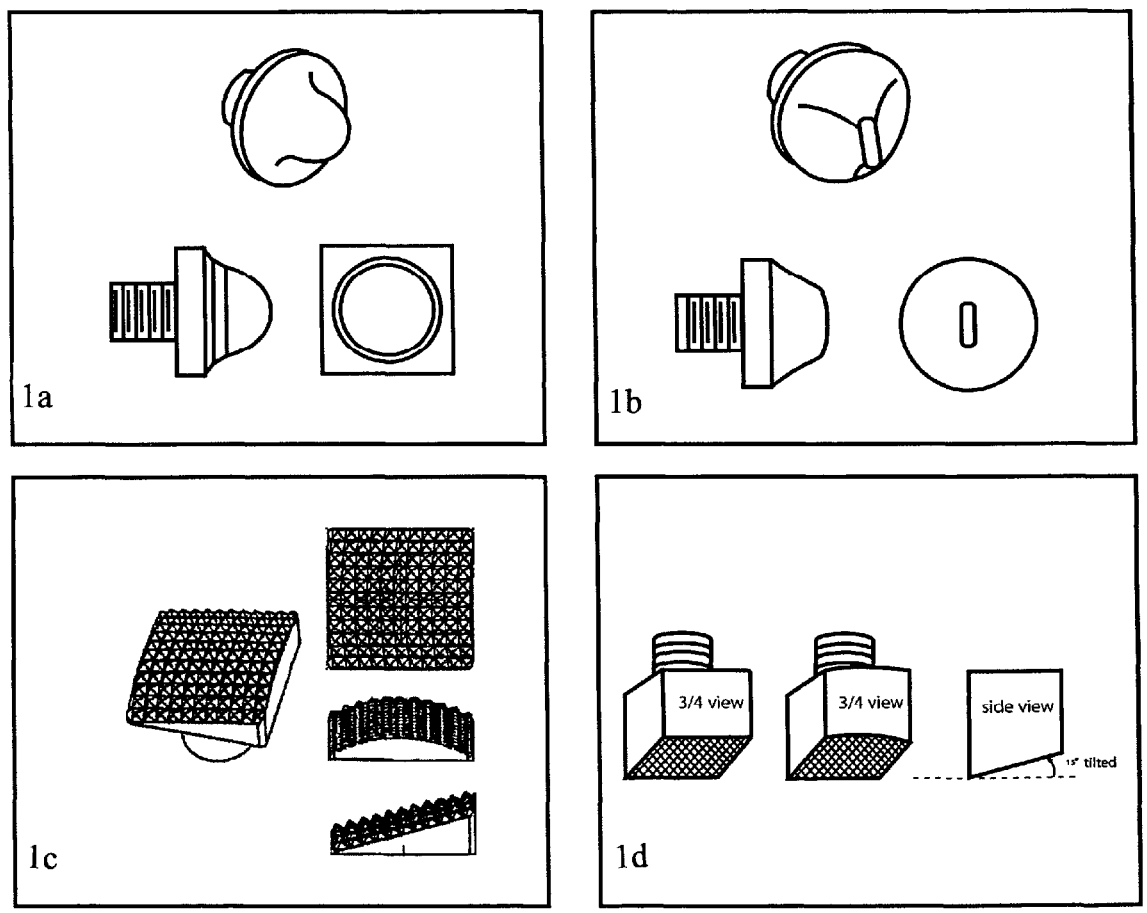
FIGS. 1a, 1b, 1c and 1d depict specially designed horn tips for directing ultrasonic radiation at the moist surface of a composite prepared according to the invention.

An ultra-lightweight heat and flame resistant composite panel having an artistic design on the surface comprises two or more layers of fire-resistant (or retardant) materials adhesively bonded together to form a composite. The fire-retardant materials can comprise paper, fabric, foam, honeycomb or paper-backed adhesive. The term "fire-retardant (or resistant) materials" is used in this specification to refer to materials that comprise fire-retardant (or resistant) materials, or materials that are treated such that the treated materials are fire-retardant (or resistant), whether or not the original material before treatment was fire-retardant (or resistant). Suitable paper and fabric for use with the invention is NOMEX® paper and fabric comprising aramid polyamide polymers, available from DuPont. Suitable NOMEX® paper is available in thicknesses of about 7 mil to about 4 mm. The paper may be selected for the intended application of the ultra-lightweight panel, and the thickness should be selected to provide sufficient stability to the panel and to meet government regulations for heat release and smoke density. It has been found that a NOMEX® paper thickness of about 23 mils provides acceptable stability for use as a bulkhead in an aircraft and also meets or exceeds FAA heat release and smoke density regulations. Suitable fabrics include substantially 100% NOMEX® content fabrics available from IBENA Testilwerke Beckmann Gmbh such as Profire™ comprising NOMEX® N 104 yarn in the warp and weft directions (FD 430±10 Fd./10 cm warp thread density, 320±10 Fd./10 cm weft thread density as measured by DIN EN 1049/2) woven in a twill 3/1 weave and having a total mass as measured by ISO 3801 of 185±5 g/m$^2$. It is also believed that fabrics made from NOMEX® and having additional fire-retardant components such as those found in IBENA PROTECT® or any fire retardant materials are suitable for use in the invention Suitable fire-retardant foams include Solimide® Densified HT polyimide foam available from Degussa Corp. and DAX 90 from Skandia, Inc. having densities in the range of about 4 to about 7 lbs./ft.$^3$ Foams of density in the range of about 5 to about 6.5 lbs./ft.$^3$ have been found to provide sufficient stability and good heat release and smoke density protection for ultra-lightweight panels to be used as bulkheads in aircraft. It has also been found that less dense foams are easier to carve according to the invention to give a three dimensional effect over more dense foams, while more dense foams provide greater durability in the ultra-lightweight panel over less dense foams. The foam may be selected according to the structural requirements, safety requirements and decorative effects desired in the final application of the ultra-lightweight panel.

Suitable fire-retardant honeycombs include any NOMEX® honeycomb, such as HRH®-10 aramid fiber/phenolic resin honeycomb available from Hexcel Corporation of Pleasanton, Calif. Any NOMEX® honeycomb or other fire-retardant (or fire-retardant treated) honeycomb should be suitable so long as the honeycomb can be bonded into the composite of the invention.

The fire-retardant layers are bonded using fire-retardant adhesives well known in the art for bonding such materials. Suitable fire-retardant adhesives may comprise thermoplastic, thermoset or pressure sensitive adhesives. Other adhesives may also be used so long as the final product passes any required safety testing for the application of the ultra-lightweight panel, such as smoke density or heat release. The adhesives may comprise sheets of about 3 to about 45 mil or may comprise liquid, and may be selected and bonded to the layers of the ultra-lightweight panel according to procedures well known in the art. Suitable fire-retardant thermoplastic adhesives include Bostik® film adhesive 10-321 available from Bostik, Inc. A suitable fire-retardant thermoset adhesive is Bostik® 610, also available from Bostik, Inc. A suitable pressure sensitive adhesive is Bostik® 576, also available from Bostik, Inc. Kimco Products 65/65 Adhesive nos. 8110401-2; 8110401-3; 8110401-4; 8110401-5; 8110401-6; 8110401-7; 8110401-8; 8110401-9; 8110401-10; 8110401-11; 8110401-12; 8110401-13; 8110401-14; 8110401-15; and 8110401-16, available from Kimco Products of Wylie, Tex., are available as thermoset or thermoplastic liquids and are believed to also be suitable for use in the invention. It has been found that sufficient adhesion between the layers of fire-retardant materials comprising the ultra-lightweight panel can be accomplished by simple heat pressing of the composite layers with 3 or 5 mil adhesive sheets or sufficient amounts of liquid adhesive disposed between the layers. Those skilled in the art will be able to determine the appropriate amount and type of adhesive to use according to the desired use of the composite without undue experimentation.

Figure 7:
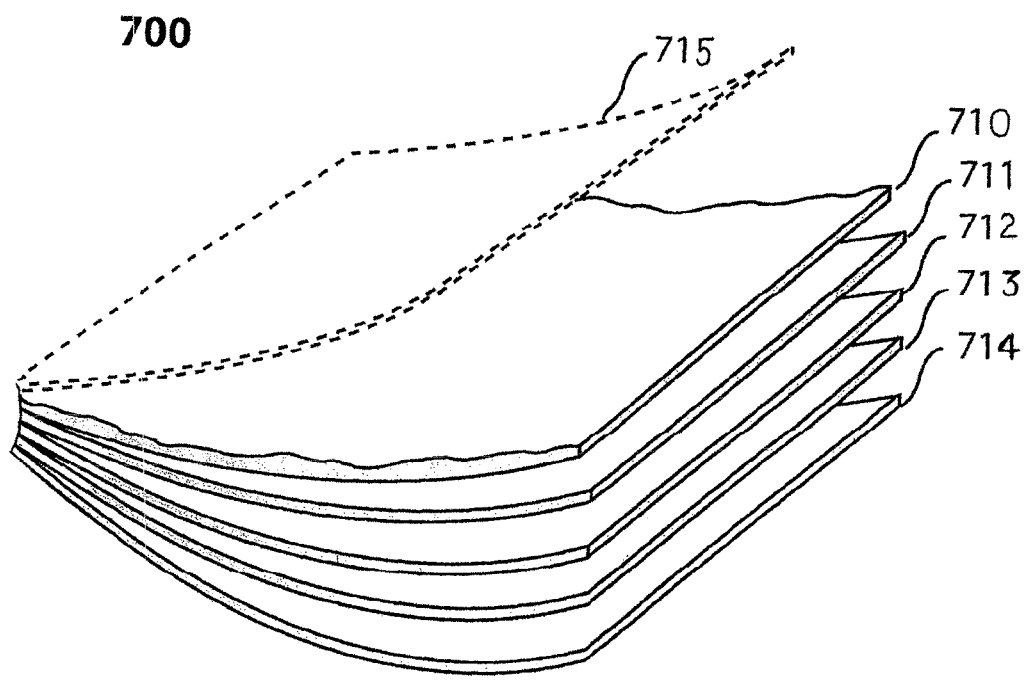
FIG. 7 depicts yet another embodiment of the invention.

A plurality of fire-resistant layers can be adhesively bonded in the following manner, as depicted in FIG. 7. A first layer 710 of an ultra-lightweight panel 700, e.g. 23 mil NOMEX® 411 paper, may be adhesively bonded by heat pressing the first layer 710 to a first side of a second layer 712, e.g. Solimide® Densified HT foam having a density of 6.4 lbs./ft.$^3$, using a first layer of adhesive 711, e.g. a 3~5 mil layer of Bostik® film adhesive 10-321 or a layer of Kimco Products 65/65 Adhesive no. 8110401-2. The second side of the second layer 712 may then be similarly adhesively bonded to a first side of a third layer 714, such as a paper-like backing for peeling off, using a second layer of adhesive 713, e.g., a 3~5 mil layer of Bostik® film adhesive 10-321 or other fire-resistant adhesive. Alternatively, the first layer 710 may comprise fire-retardant materials such as IBENA® NOMEX® fabric or any other fire-retardant treated materials. The second layer 712 may comprise HRH®-10 aramid fiber/phenolic resin honeycomb such as HRH-10® from Hexcel Corp. or Solimide® Densified HT Foam or DAX 90® Foam from Skandia Corp. The third layer 714 may comprise a paper-like backing for peeling off from layer 712. First and second adhesive layers 711 and 713 may comprise adhesives such as Bostik® 321, Bostik® 576, Bostik® 610, Kimco Products 65/65 Adhesive nos. 8110401-2 through 8110401-16 or other fire-resistant adhesives. For example, another embodiment of the invention may comprise a first layer 710 of 23 mil NOMEX® 411 paper adhesively bonded with a first adhesive layer 711 of Bostik® 321 adhesive to a first side of a second layer 712 of HRH®-10 aramid fiber/phenolic resin honeycomb from Hexcel Corp. A third layer 714 may comprise a paper-like backing which is adhesively bonded to the second side of the second layer 712 with a second adhesive layer 713 of Bostik® 610 adhesive or other fire-resistant adhesive. A plurality of layers of fire-retardant materials may be prepared in this manner according to the requirements of the application. Typically a fire-resistant seal coat 715 is placed on one of the outer surfaces of the composite 700.

It has also been found that a design object, for example Nomex® yarn or any other fire-resistant material may be placed between two of the layers of the composite, along with the adhesive, to form a significant three dimensional surface design in the resulting panel. For example, fire-retardant design materials, such as Nomex® yarn or green leaves or any other fire-retardant or fire-retardant treated material chosen by the designer, may be inserted between any two layers of the composite, along with the adhesive, in a decorative design. The composite can be prepared as discussed previously by heat bonding the layers. After bonding, the inserted fire-retardant design materials can provide significant three-dimensional effects to the composite.

A method for forming a decorative three-dimensional outer layer of the composite using ultrasonic radiation is also provided. It has been found that the surface of the NOMEX® paper or fabric, when moist, can be "carved" (or embossed) to form a three-dimensional image using directed ultrasonic radiation. This carving technique can be used alone or in addition to the insertion of a fire-retardant material between layers of the composite as previously described. The image that can be formed is not limited in any fashion but can be determined by the designer for the application. Typically, a design is placed on the moistened surface of the composite that sets out the design to be formed, but the designer may also form a suitable design freehand. A suitable apparatus for directing ultrasonic radiation onto the surface of the moist fire-retardant paper or fabric include handheld probe ultrasonic assemblies operational at frequencies of 20 kHz or 40 kHz available from Dukane Ultrasonics located in St. Charles, Ill. Other ultrasonic assemblies or automatic system integrated to an XY table believed to be useful for carving the moist surface of the fire-retardant paper or fabric are automatic and can emit ultrasonic radiation at a frequency of about 15 kHz to about 220 kHz.

The surface of the fire-retardant paper or fabric may be moistened using water, such as by spraying, brushing, rubbing or sponging. The fire-retardant paper should not be overly moist as this can cause breaks in the fire-retardant paper while handling and carving. However, it should be moist enough for embossing without burning of the surface by the ultrasonic radiation. Those skilled in the art will be able to determine a sufficient amount of moisture without undue experimentation.

Also provided are horns and inventive tips attached to horns for the ultrasonic assembly that can be used to direct the ultrasonic radiation to the surface of the moist fire-retardant paper or fabric to form the carved image. Tips may be made out of any suitable material currently in use or later developed for use with ultrasonic radiation assemblies Tips for use in preparing the ultra-lightweight panels according to the invention are depicted in FIGS. 1a, 1b, 1c and 1d. FIGS. 1a and 1b depict tip designs that may be used to create even carved lines on the surface of the moist composite. Such tips have one or more substantially level faces with respect to the composite such that the distance between the tip of the ultrasonic assembly and the composite surface is substantially the same over the tip. FIGS. 1a and 1b are meant to be illustrative only, and in no way limit tips that may be used for ultrasonic carving of composites of the invention. Rather, they are illustrative only and additional tip designs can be prepared by those of ordinary skill in the art to create the type of effect desired on the composite surface.

It has also been found that tips having a tilted face with respect to the moist surface to be carved provide a novel three dimensional effect on the carved surface. Such tips have one or more tilted faces with respect to the composite such that the face of the tilted plate varies in pressure from a surface over the face of the tip when the ultrasonic assembly is maintained substantially perpendicular position in relation to the surface. Suitable inventive tips are depicted in FIGS. 1c and 1d which depict tips having tilted faces round or square in shape. The depicted tips in FIGS. 1c and 1d also have knurled surfaces to enhance the bonding and carving affect, although this is not a requirement of a tip according to the invention. Other types of inventive tips having a tilted face with respect to the moist surface to be carved should also suitable for use in the invention. FIGS. 1c and 1d are meant to be illustrative only, and in no way limit tips that may be used for ultrasonic carving of composites of the invention. Rather, they are illustrative only and additional tip designs can be prepared by those of ordinary skill in the art to create the type of effect desired on the composite surface.

It is believed that other surface carving methods for creating a three dimensional effect may be used, such as by using a heat stamping machine. It is also believed that a laser-carving machine would be suitable to carve the surface. Those skilled in the art will be able to select a suitable carving method and assembly for creating the desired three-dimensional effect on the surface of the ultra-lightweight panel of the invention.

Also provided is a method for coloring the surface of the fire-retardant paper or fabric. The coloring can take place before or after carving, if both coloring and carving are desired. Coloring right before carving can provide sufficient moisture for carving using the ultrasonic radiation. However, good results can also be obtained by coloring the surface of the fire-retardant paper or fabric after carving. For example, the surface may be hand painted using the coloring selected by the designer.

Suitable colorants include natural paints such as Marie's™ Chinese Painting Color made from natural mineral colors, sunproof colors and cowhide glue. The color can be applied as known in the art by the designer to achieve whatever decorative effect is desired.

Alternatively, the paper or fabric that forms the surface of the ultra-lightweight panel of the invention may be printed. For example, the paper or fabric may be printed using digital printing systems such as DuPont® Artistri® Technology for digital textile printing systems using ink jet printers. Typically, the fire-retardant or fire-retardant treated material is printed prior to preparation of the composite.

Once the surface of the composite is carved and/or colored and dried, a sealing layer may be applied. For example, the sealing coat may be applied by spraying. The sealing layer should also contain a fire retardant material. Suitable sealants include Jet Flex® aircraft interior finish solvent-based polyurethane enamel available from Sherwin Williams and Kimco Products 65/65 Clear Paint. Jet Flex® is a two component polyurethane coating. Kimco Products 65/65 Clear Paint is a glossy clear paint, but flattening agents or powder may be added to provide a matte finish. The sealant may be a liquid, film or particle, and may comprise a resin, Tedlar® film or Teflon® film.

Figure 2:
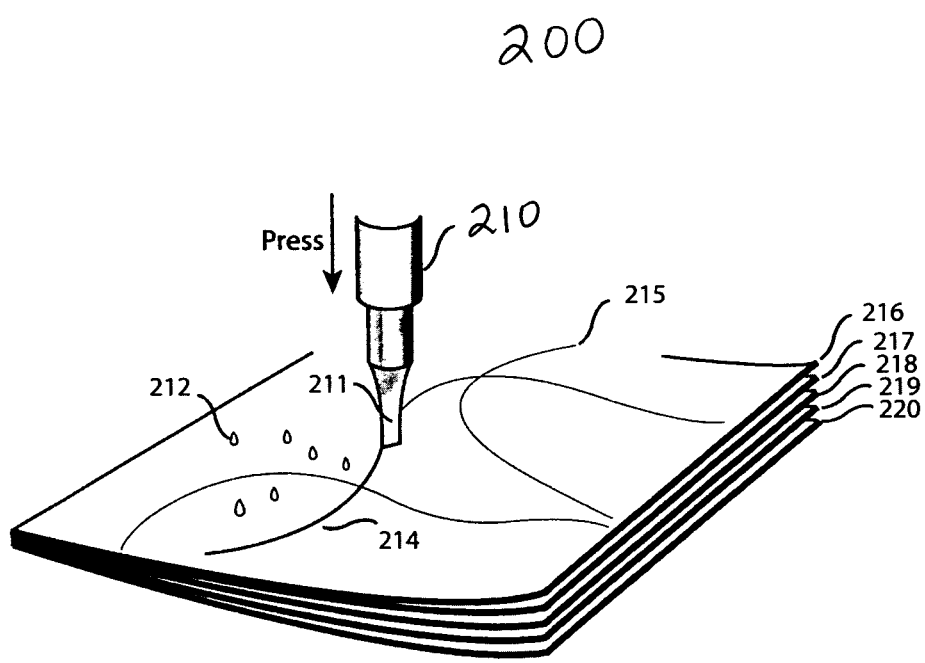
FIG. 2 depicts a method of carving the moist surface of a composite prepared according to the invention.

FIG. 2 depicts an ultra-lightweight heat and flame resistant composite panel 200 having an artistic design carved, or embossed, on the surface according to the invention. The depicted panel 200 comprises a first layer 216, for example a NOMEX® paper or fabric as previously described. A second layer 218 may comprise a fire resistant foam, honeycomb or paper. A first sheet of fire-retardant adhesive 217 may be interposed between the first layer 216 and the second layer 218. Additional layers, for example a third layer 220 such as a NOMEX® paper or paper-like backing attached to an adhesive film may be included as well. A second sheet of fire-retardant adhesive 219 would be interposed between the second layer 218 and the third layer 220 paper-like backing. A design pattern 215 may be placed on the surface of the panel to assist in making a specific design, for example where it is desired to produce a plurality of panels having substantially the same design. Prior to carving, a layer of moisture 212 is placed on the surface of the panel 200 on the layer that is to be carved, typically a NOMEX® paper or fabric. FIG. 2 depicts a panel having a design carved on the outer surface of the first layer 216. An ultrasonic assembly 210, for example a handheld probe operating at about 20 kHz or 40 kHz, is fitted with a horn and tip 211 selected for creating the desired three dimensional effect on the surface of the panel 200 such as those depicted in FIGS. 1a-1d. During carving, a three dimensional surface is created on the surface of the panel 200 having one or more lower dimensional regions 214. As discussed, the panel 200 may be painted after carving, or may be painted before carving in order to provide the moisture layer 212. Alternatively, the NOMEX® paper or fabric may be printed using ink jet technology prior to carving.

Figure 3:
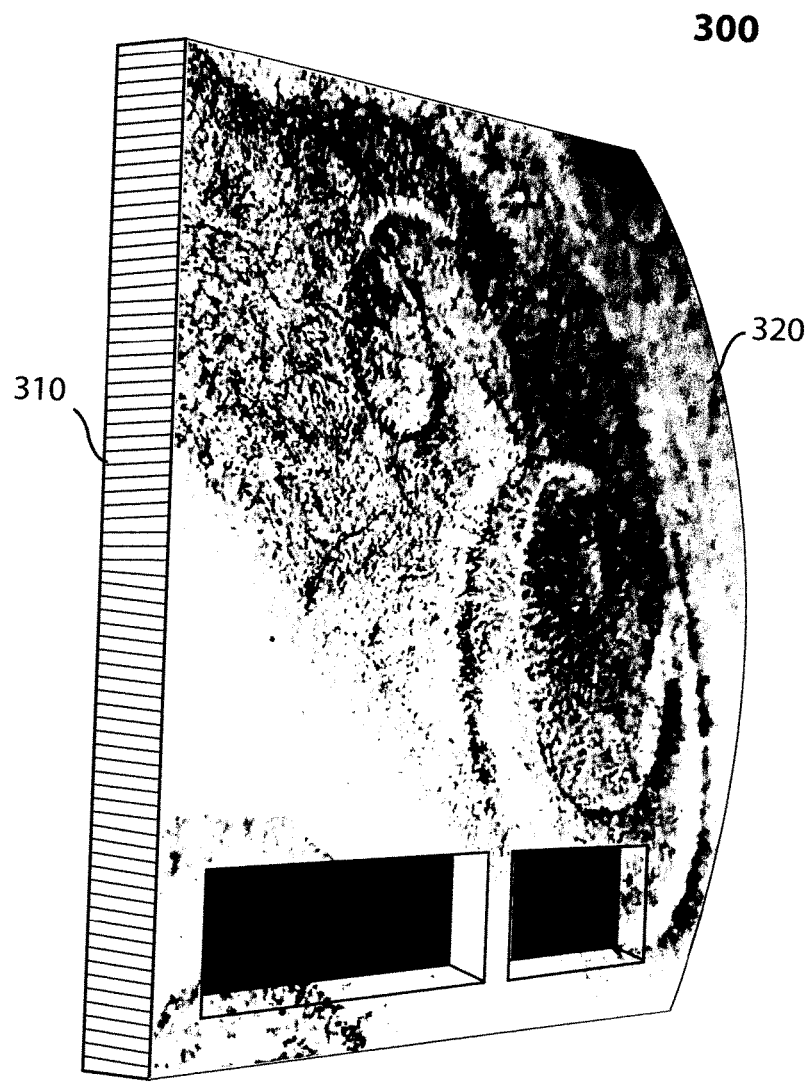
FIG. 3 depicts an ultra-lightweight heat and flame resistant composite panel having a three-dimensional artistic design on the surface when used as a bulkhead panel on a aircraft.

FIG. 3 depicts an ultra-lightweight heat and flame resistant composite panel 300 having an artistic design carved, or embossed, on the surface 320 according to the invention for use as an aircraft bulkhead panel. The composite panel 300 is attached to a surface 310, depicted in FIG. 3 as an airplane structure, such that the carved surface 320 is facing outward for viewing. The composite panel 300 may be attached to the surface 310 by any method of attachment now known or later developed, including staples; screws; nails; velcro; or adhesive.

The invention may be used in any application and is particularly suitable for those applications where heat release and smoke density characteristics are desired. The ultra-lightweight heat and flame resistant composite panels may be incorporated in any manner desired as is known by those skilled in the art. For example, the ultra-lightweight heat and flame resistant composite panels may be adhesively bonded or otherwise attached to a structure such as a vehicle. It has been found that where the ultra-lightweight heat and flame resistant composite panel comprises a paper-backed adhesive layer on one of the outer surfaces that the paper may be removed and the adhesive may used to easily bond the panel to a structure, such as a vehicle.

EXAMPLES

The invention is further illustrated by the following nonlimiting examples. These examples are intended for illustration purposes only and are not intended to limit the application of the inventive ultra-lightweight heat and flame resistant composite panels whatsoever.

Test Methods

Several composites were made according to the invention and were tested for heat release and smoke density according to 14 C.F.R. Part 25 §25.853, Appendix F, Parts IV (OSU 65/65) and V (ASTM F814-83) by Herb Curry, Inc. of Mt. Vernon, Ind.

Example 1

Figure 4:
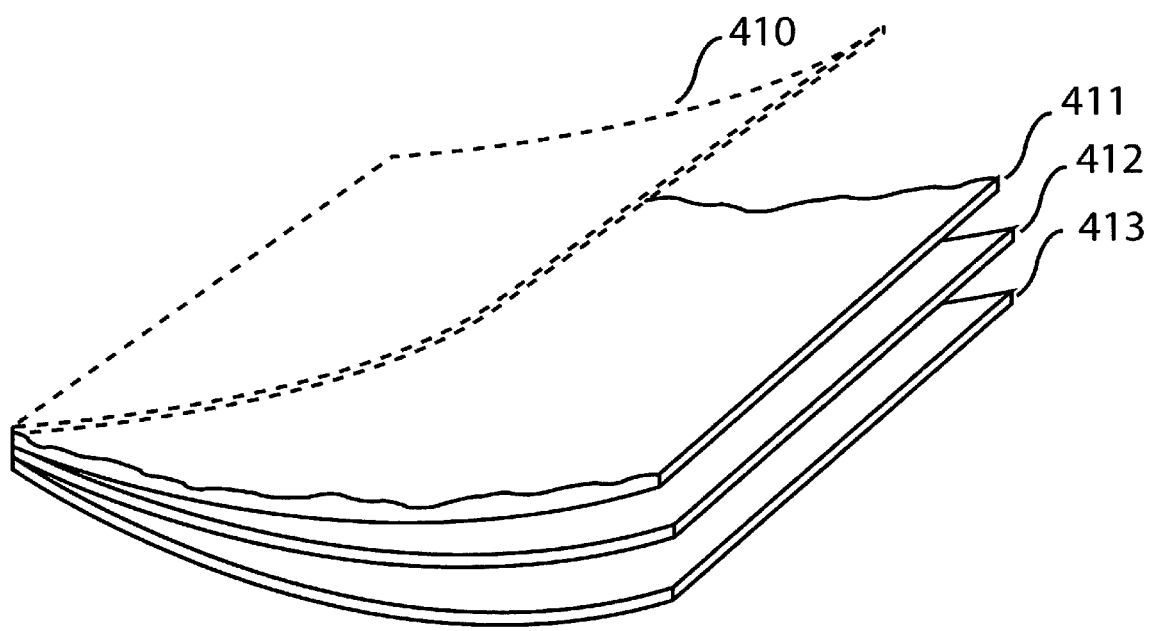
FIG. 4 depicts the layers of various embodiments of the invention as described in Examples 1 through 5 and 7 through 8.

A composite panel was prepared by adhesively bonding a fire-resistant NOMEX® 411 paper of 23 mil thickness to an HRH-10-1/8-5.0™ honeycomb backing with a Bostik® 10-321 5 mil thick sheet of thermoplastic adhesive. The paper and honeycomb were bonded by heat pressing using a hot iron. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the NOMEX® 411 paper; layer 412 depicts the Bostik® 10-321 sheet of thermoplastic adhesive; and layer 413 depicts the HRH-10-1/8-5.0™ honeycomb backing.

Example 2

A composite panel was prepared by adhesively bonding IBENA® Profire® fabric made of NOMEX® N 104 yarn in the warp and weft directions (FD 430±10 Fd./10 cm warp thread density, 320±10 Fd./10 cm weft thread density as measured by DIN EN 1049/2) woven in a twill 3/1 weave and having a total mass as measured by ISO 3801 of 185±5 g/m$^2$ to an HRH-10-1/8-5.0™ honeycomb backing with a Bostik® 10-321 5 mil thick sheet of thermoplastic adhesive. The fabric and honeycomb were bonded by heat pressing using a hot iron. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the IBENA® Profire® fabric; layer 412 depicts the Bostik® 10-321 sheet of thermoplastic adhesive; and layer 413 depicts the HRH-10-1/8-5.0™ honeycomb backing.

Example 3

A composite panel was prepared by adhesively bonding a fire-resistant NOMEX® 411 paper of 23 mil thickness to a TA-301 Solimide Densified HT Polyimide Foam with a Bostik® 10-321 5 mil thick sheet of thermoplastic adhesive. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the NOMEX® 411 paper; layer 412 depicts the Bostik® 10-321 sheet of thermoplastic adhesive; and layer 413 depicts the TA-301 Solimide Densified HT Polyimide Foam backing.

Example 4

A composite panel was prepared by adhesively bonding IBENA® Profire® fabric made of NOMEX® N 104 yarn in the warp and weft directions (FD 430±10 Fd./10 cm warp thread density, 320±10 Fd./10 cm weft thread density as measured by DIN EN 1049/2) woven in a twill 3/1 weave and having a total mass as measured by ISO 3801 of 185±5 g/m$^2$ to a foam backing to a TA-301 Solimide Densified HT Polyimide Foam backing having a density of about 5 lbs./ft.$^3$ with a Bostik® 10-321 5 mil thick sheet of thermoplastic adhesive. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the IBENA® Profire® fabric; layer 412 depicts the Bostik® 10-321 sheet of thermoplastic adhesive; and layer 413 depicts the TA-301 Solimide Densified HT Polyimide Foam backing.

Example 5

A composite panel was prepared by adhesively bonding a fire-resistant NOMEX® 411 paper of 23 mil thickness to a second fire-resistant NOMEX® 411 paper of 23 mil thickness as backing with a Bostik® 10-321 5 mil thick sheet of thermoplastic adhesive. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the first layer of NOMEX® 411 paper; layer 412 depicts the Bostik® 10-321 sheet of thermoplastic adhesive; and layer 413 depicts the second layer of NOMEX® 411 paper.

Example 6

Figure 5:
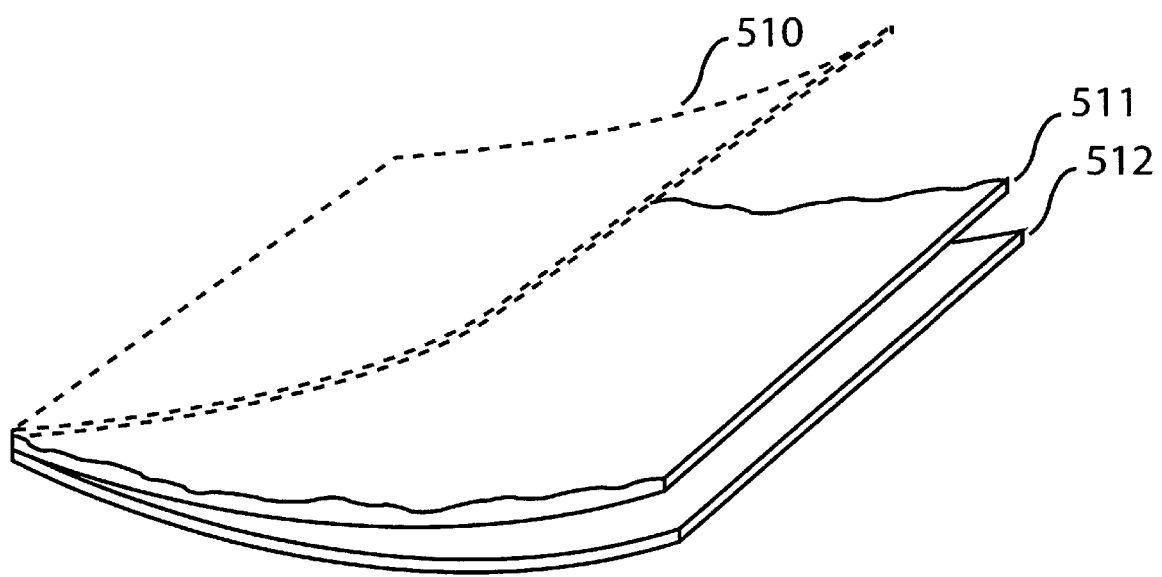
FIG. 5 depicts the layers of an embodiment of the invention as described in Example 6.

A composite panel was prepared by adhesively bonding a fire-resistant NOMEX® 411 paper of 23 mil thickness to a paper-backed Bostik® 10-321 5 mil thick sheet of thermoplastic adhesive. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 5, where layer 510 depicts the JetFlex® polyurethane sealing coat; layer 511 depicts the NOMEX® 411 paper; and layer 512 depicts the paper-backed Bostik® 10-321 sheet of thermoplastic adhesive.

Example 7

A composite panel was prepared by adhesively bonding a fire-resistant NOMEX® 411 paper of 23 mil thickness to a TA-301 Solimide Densified HT Polyimide Foam backing having a density of about 5 lbs./ft.$^3$ with a Bostik® 10-321 5 mil thick sheet of thermoplastic adhesive. Prior to bonding, the paper was printed using DuPont® Artistri® ink jet technology to provide a printed design on one surface of the paper, which was then placed in the composite panel as the outer facing surface of the paper. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the ink jet printed NOMEX® 411 paper; layer 412 depicts the Bostik® 10-321 5 mil thick sheet of thermoplastic adhesive; and layer 413 depicts the TA-301 Solimide Densified HT Polyimide Foam backing.

Example 8

A composite panel was prepared by adhesively bonding IBENA® Profire® fabric made of NOMEX® N 104 yarn in the warp and weft directions (FD 430±10 Fd./10 cm warp thread density, 320±10 Fd./10 cm weft thread density as measured by DIN EN 1049/2) woven in a twill 3/1 weave and having a total mass as measured by ISO 3801 of 185±5 g/m$^2$ to a foam backing to a TA-301 Solimide Densified HT Polyimide Foam backing having a density of about 5 lbs./ft.$^3$ with a Bostik® 10-321 5 mil thick sheet of thermoplastic adhesive. Prior to bonding, the fabric was printed using DuPont® Artistri® ink jet technology to provide a printed design on one surface of the fabric, which was then placed in the composite panel as the outer facing surface of the fabric. The bonded composite was moistened with water and then carved using a Dukane Ultrasonics handheld ultrasonic assembly system operating at about 20 kHz. A tip having a knurled, tilted face in relation to the surface to be carved was placed on the horn of the ultrasonic assembly system as seen in FIGS. 1c & 1d and used to prepare a three dimensional carving. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 4, where layer 410 depicts the JetFlex® polyurethane sealing coat; layer 411 depicts the ink jet printed IBENA® Profire® fabric; layer 412 depicts the Bostik® 10-321 sheet of thermoplastic adhesive; and layer 413 depicts the TA-301 Solimide Densified HT Polyimide Foam backing.

Example 9

Figure 6:
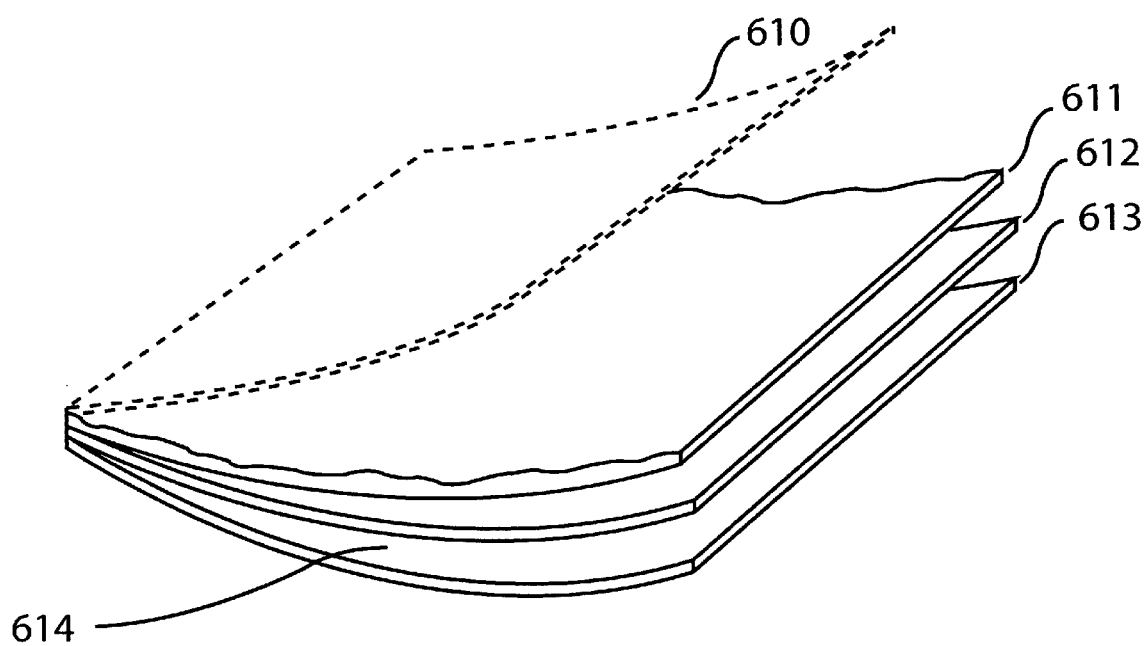
FIG. 6 depicts the layers of an embodiment of the invention as described in Example 9.

A composite panel was prepared by adhesively bonding an IBENA® Profire® fabric made of NOMEX® N 104 yarn in the warp and weft directions (FD 430±10 Fd./10 cm warp thread density, 320±10 Fd./10 cm weft thread density as measured by DIN EN 1049/2) woven in a twill 3/1 weave and having a total mass as measured by ISO 3801 of 185±5 g/m$^2$ to a DAX® 90 foam backing having a density of about 5 lbs./ft.$^3$ with a Bostik® 10-321 5 mil thick sheet of thermoplastic adhesive. A fire resistant NOMEX® yarn was inserted, along with the adhesive, between the layers of the foam and fabric to form a very three-dimensional decorative pattern. The bonded composite was moistened with water and then carved using a Dukane Ultrasonics handheld ultrasonic assembly system operating at about 20 kHz. A tip having a knurled, titled face in relation to the surface to be carved was placed on the horn of the ultrasonic assembly system as seen in FIGS. 1c & 1d and used to prepare a three dimensional carving. The carved surface was then painted using Marie's™ Chinese Painting Color. A JetFlex® polyurethane sealing coat was placed on the carved and colored surface and the coated surface was dried using fanned ambient air. The characteristics of the composite, including weight, heat release rate test results, smoke density test results and relative cost are given in Table 1. The composite is depicted in FIG. 6, where layer 610 depicts the JetFlex® polyurethane sealing coat; layer 611 depicts the IBENA® Profire® fabric; layer 612 depicts the Bostik® 10-321 sheet of thermoplastic adhesive; layer 613 depicts the DAX® 90 foam backing; and 614 depicts the insertion position of the fire-resistant NOMEX® yarn insert.

Table 1 provides the characteristics of Examples 1 through 8 compared to a NOMEX® yarn woven bulkhead as currently used today in aircraft. The examples all meet the heat rate release and smoke density values of the FARs as does the currently used NOMEX® yarn bulkhead, but at lower cost and weight. Acoustic contribution varies according to the materials used to form the composite.

TABLE 1

| Materials | Weight of Composite oz/ft.$^2$ | OSU 65/65 kW/m$^2$ (Must not exceed 65 to satisfy FAR) | Smoke Density (Must not exceed 200 to satisfy FAR) | Acoustic Contribution | Relative Cost |
|---|---|---|---|---|---|
| NOMEX® Yarn | 16 | Pass | Pass | Yes | ***** |
| Example 1 | 1.65 | 27/65 | 68/200 | Possible | *** |
| Example 2 | 2.15 | 27/65 | 68/200 | Yes | *** |
| Example 3 | 1.24 | 56/65 | 151/200 | Possible | *** |
| Example 4 | 1.74 | 56/65 | 151/200 | Yes | *** |
| Example 5 | 1.23 | 27/65 | 68/200 | — | ** |
| Example 6 | 1.00 | 27/65 | 68/200 | — | ** |
| Example 7 | 1.24 | 56/65 | 151/200 | Possible | ** |
| Example 8 | 1.74 | 56/65 | 151/200 | Yes | ** |
| Example 9 | 1.87 | Pass | Pass | Yes | ** |

The foregoing embodiments have been presented for purposed of illustration and description only and are not to be construed as limiting the scope of the invention in any way. The scope of the invention is to be determined from the claims appended hereto.

What is claimed is:

1. A heat and flame resistant composite panel consisting essentially of:
   a first outer layer of a flame-resistant aramid polyamide polymer material;
   a second outer layer comprising a foam, the first outer layer is made of a different fire-retardant material than the second outer layer and the first and second outer layers are bonded together with an adhesive;
   intermediate fire-retardant material disposed in a decorative three-dimensional pattern along with the adhesive between and directly adjacent to the first outer layer and the second outer layer, the decorative three-dimensional pattern of the intermediate fire-retardant material having a selected size, vertical location and shape; and
   a seal coat on outermost surfaces of at least one of the first outer layer and the second outer layer,
   wherein the outermost surfaces of the at least one of the first outer layer and the second outer layer has a three-dimensional surface pattern matching the selected size, vertical location and shape of the decorative three-dimensional pattern of the intermediate fire-retardant material formed by bonding the intermediate fire-retardant material and the at least one of the first outer layer and the second outer layer,
   wherein the fire-retardant or flame resistant materials comprise materials that are fire-retardant or that have been treated to be fire-retardant, and
   wherein the composite panel when formed is ¼ inch thick or less.

2. The heat and flame resistant composite panel of claim 1, wherein the intermediate fire-retardant material comprises a non-woven fire-retardant yarn.

3. The heat and flame resistant composite panel of claim 1, wherein the outermost surfaces of the at least one of the first outer layer and the second outer layer are embossed with ultrasonic radiation of frequency of greater than 20 kHz to about 220 kHz after formation of the composite panel.

4. The heat and flame resistant composite panel of claim 1, wherein the ultrasonic radiation comprises a frequency of either greater than 20 kHz to about 40 kHz.

5. The heat and flame resistant composite panel of claim 3, wherein the embossed outermost surfaces of the at least one of the first outer layer and the second outer layer are painted prior to application of the seal coat.

6. The heat and flame resistant composite panel of claim 1, wherein the outermost surfaces of the at least one of the first outer layer and the second outer layer are printed prior to formation of the composite panel.

7. The heat and flame resistant composite panel of claim 1, wherein the composite panel has a weight of less than about 2.5 oz./ft.$^2$.

8. The heat and flame resistant composite panel of claim 1, wherein the composite panel measures less than about 28/65 in the OSU 65/65 Heat Release test as specified in Part IV of Appendix F of 14 C.F.R. §25 (2004).

9. The heat and flame resistant composite panel of claim 1, wherein the composite panel measures less than about 152/200 in smoke density testing according to the testing procedure ASTM F814-83 specified in Part V of Appendix F of 14 C.F.R. §25 (2004).

10. The heat and flame resistant composite panel of claim 1, wherein the composite panel measures less than about 69/200 in smoke density testing according to the testing procedure ASTM F814-83 specified in Part V of Appendix F of 14 C.F.R. §25 (2004).

11. The heat and flame resistant composite panel of claim 1, wherein the composite panel measures less than about 1/65 in the OSU 65/65 Heat Release test as specified in Part IV of Appendix F of 14 C.F.R. §25 (2004).

12. The heat and flame resistant composite panel of claim 1, wherein the composite panel measures less than about 15/200 in smoke density testing according to the testing procedure ASTM F814-83 specified in Part V of Appendix F of 14 C.F.R. §25 (2004).

13. The heat and flame resistant composite panel of claim 1, wherein the intermediate fire-retardant material is non-woven.

14. A heat and flame resistant composite panel consisting essentially of:
  a first outer layer of a flame-resistant aramid polyamide polymer;
  a second outer layer of a fire-retardant foam, wherein the first outer layer and the second outer layer are bonded with a fire-retardant material;
  intermediate material disposed in a decorative three-dimensional pattern along with the fire-retardant material between and directly adjacent to the first and second outer layers the decorative three-dimensional pattern of the intermediate material having a selected size, vertical location and shape; and
  a seal coat on outermost surfaces of at least one of the first outer layer and the second outer layer,
  wherein the outermost surfaces of the at least one of the first outer layer and the second outer layer has a three-dimensional surface pattern matching the selected size, vertical location and shape of the decorative three-dimensional pattern of the intermediate material formed by bonding the intermediate material and the at least one of the first outer layer and the second outer layer, and wherein the composite panel is acoustically insulating, and is ¼ inch thick or less.

15. The composite panel of claim 14, wherein the foam is an acoustic insulating foam.

16. The composite panel of claim 14, wherein the foam is a low density acoustic insulating foam selected from the group consisting of a polyimide insulating foam and polyurethane foam.

17. The composite panel of claim 14, wherein the foam has a density in the range of 4 to 7 lbs/ft$^3$.

18. The composite panel of claim 14, wherein the fire-retardant material is an adhesive layer that is 3-5 mil in thickness.

19. The heat and flame resistant composite panel of claim 14, wherein the intermediate-material is non-woven.

20. A heat and flame resistant composite panel consisting essentially of:
  a first outer layer of a flame-resistant aramid polyamide polymer;
  a second outer layer of a fire-retardant foam, wherein the first outer layer and the second outer layer are bonded together with a fire-retardant material;
  intermediate material having a three-dimensional shape having a selected size and vertical location, the intermediate material disposed in a decorative pattern along with the fire-retardant material between and directly adjacent to the first and second outer layers and heat bonded to the first and second outer layers to form a three-dimensional shape on outermost surfaces of at least one of the first outer layer and the second outer layer, the three-dimensional shape on the outermost surfaces matching the selected size and vertical location of the three-dimensional shape of the intermediate material, and the outermost surfaces are further exposed to ultrasonic radiation; and
  a seal coat on the outermost surfaces of the at least one of the first outer layer and the second outer layer,
  wherein the composite panel is ¼ inch thick or less.

21. The composite panel of claim 20, wherein the foam is an acoustic insulating foam.

22. The heat and flame resistant composite panel of claim 20, wherein the fire-retardant material is an adhesive.

23. The heat and flame resistant composite panel of claim 22, wherein the adhesive comprises a thermoset adhesive, a thermoplastic adhesive, a pressure sensitive adhesive, or any combination of a thermoset adhesive, a thermoplastic adhesive and a pressure sensitive adhesive.

24. The heat and flame resistant composite panel of claim 20, wherein the intermediate-material is non-woven.

* * * * *